J. B. SARGENT.

Assignor, by mesne assignments, to C. B. POST.

Sap-Spout.

No. 8,495. Reissued Nov. 19, 1878

*Attest:*

Clarence Poole

A. B. Smith

*Inventor:*

J. B. Sargent

By his atty

C. O. Smith

N. PETERS, PHOTO-LITHOGRAPHER, WASHINGTON, D. C.

UNITED STATES PATENT OFFICE.

J. B. SARGENT, OF NEW HAVEN, CONNECTICUT, ASSIGNOR, BY MESNE ASSIGNMENTS, TO CHARLES C. POST, OF BURLINGTON, VERMONT.

IMPROVEMENT IN SAP-SPOUTS.

Specification forming part of Letters Patent No. 76,530, dated April 7, 1868; Reissue No. 8,495, dated November 19, 1878; application filed September 4, 1878.

*To all whom it may concern:*

Be it known that I, J. B. SARGENT, of New Haven, in the county of New Haven and State of Connecticut, have invented a new Improvement in Sap-Spouts; and I do hereby declare the following, when taken in connection with the accompanying drawings and the letters of reference marked thereon, to be a full, clear, and exact description of the same, and which said drawings constitute part of this specification, and represent, in—

Figure 1:
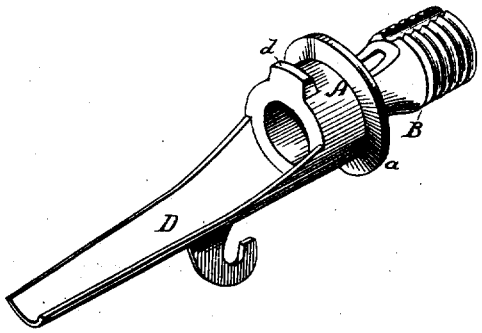
Figure 2:
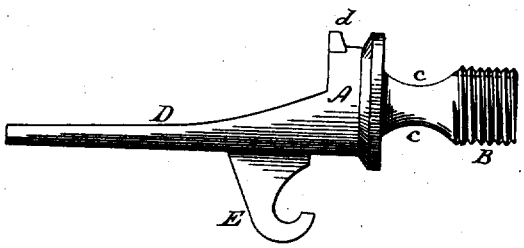

Figure 1, a perspective view; Fig. 2, a side view, and in Fig. 3 a top view.

This invention is designed to be inserted into trees for the purpose of drawing sap therefrom; and consists in the construction of a metallic tube or conductor, provided with a hollow shank, and the said shank having a screw formed upon its end for the purpose of screwing into the tree, and the space between the screw and the base of the spout, so as to form a chamber to permit the sap to enter the spout, and the base of the spout provided with a packing to prevent the escape of the sap outside of the spout, and also provided with a hook, by which the bucket may be attached to receive the sap.

In order to the better understanding of my improvement, I will proceed to describe the same as illustrated in the accompanying drawings.

A is the base of the spout, having formed thereon or attached thereto a shank, B, the said shank having formed upon its extreme end a screw-thread of less diameter than the base of the spout, as seen in the drawing; and between the screw-thread and the base the shank is reduced, as at C, Fig. 2, and through the base and the shank an opening is made, so as to form the hollow tube.

Outside the base A a conductor, D, is formed for leading the sap from the tree to the receptacle provided for the same. Upon the base A, I place a washer, *a*, of flexible or elastic material; and upon the under side of the base or conductor, and integral therewith, I form a hook, E, upon which to suspend the receptacle for the sap, or upon the top a lug, *d*, for the same purpose.

Figure 3:
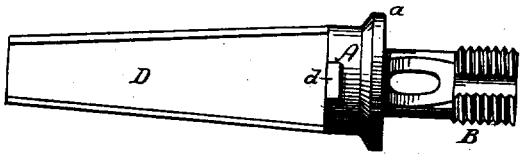

A hole is bored into the tree of the proper size to receive the thread of the screw on the shank. Then the shank is turned into the hole until the packing at the base of the tube is borne hard against, and so as to pack closely the joint between the tree and the base. The space C forms a chamber between the base and screw, into which the sap runs, and thence through the spout to the receptacle. Grooves *g* may be formed through the thread, as seen in Fig. 3, through which the sap will pass to the chamber.

This spout I form from any suitable metal, and protect the same from corrosion or rust by any known process of covering or coating the metal.

I do not wish to be understood as broadly claiming a metallic sap-spout constructed with a screw-shank, as such, I am aware, is not new.

Having thus fully described my invention, what I claim therein as new and useful, and desire to secure by Letters Patent, is—

1. A sap-spout constructed with the hollow screw-shank B, having formed in the shank, between the screw and the base of the spout, the chamber C C, in the manner and for the purpose set forth.

2. A sap-spout provided with the packing *a* around the shank, in the manner and for the purpose substantially as herein set forth.

3. A sap-spout provided with a shoulder, A, to bear upon and close the opening into the tree, and a shank to penetrate said opening, combined with an intervening part, *c*, of less diameter than said shank, to form a chamber, as set forth.

4. A sap-spout having a shoulder, A, and neck *c* between said shoulder and its shank, combined with an opening, *e*, in said neck communicating with the spout-tube, through which the sap escapes.

5. A sap-spout having a screw-shank, B, combined with a drainage-gutter, *g*, cut across the screw-thread, substantially as shown.

6. A sap-spout provided with a hook, E, integral with said spout, for the purpose set forth.

J. B. SARGENT.

Witnesses:
W. F. BALDWIN,
A. W. PARMELEE.